United States Patent [19]

Barbier et al.

[11] Patent Number: 5,053,764
[45] Date of Patent: Oct. 1, 1991

[54] SYSTEM FOR THE DISPLAY OF IMAGES IN HALF TONES ON A MATRIX SCREEN

[75] Inventors: Bruno Barbier, Le Bouscat; Jean N. Perbet, Eysines; Jean J. Favoi, Martignas/Jalles, all of France

[73] Assignee: Thomson CSF, Paris, France

[21] Appl. No.: 252,139

[22] Filed: Oct. 3, 1988

[30] Foreign Application Priority Data

Oct. 9, 1987 [FR] France .................. 87 13959

[51] Int. Cl.$^5$ .............................................. G09G 3/22
[52] U.S. Cl. .................................. 340/793; 340/703
[58] Field of Search ............ 340/793, 703, 798, 799

[56] References Cited

U.S. PATENT DOCUMENTS

| | | |
|---|---|---|
| 3,863,023 | 1/1975 | Schmersal et al. .................. 340/793 |
| 4,385,807 | 5/1983 | Perbet et al. . |
| 4,390,244 | 6/1983 | Hareng et al. . |
| 4,427,997 | 1/1984 | Hareng et al. . |
| 4,430,650 | 2/1984 | Billard et al. . |
| 4,525,708 | 6/1985 | Hareng et al. . |
| 4,525,709 | 6/1985 | Hareng et al. . |
| 4,535,327 | 8/1985 | Hareng et al. . |
| 4,569,575 | 2/1986 | Le Pesant et al. . |
| 4,653,858 | 3/1987 | Szydlo et al. . |
| 4,668,051 | 5/1987 | Mourey et al. . |
| 4,701,021 | 10/1987 | Le Pesant et al. . |
| 4,732,873 | 3/1988 | Perbet et al. . |
| 4,810,637 | 3/1989 | Szydlo et al. . |
| 4,818,052 | 4/1989 | Le Pesant et al. . |
| 4,824,216 | 4/1989 | Perbet et al. . |
| 4,827,255 | 5/1989 | Ishii ..................................... 340/793 |

FOREIGN PATENT DOCUMENTS

0143485 9/1981 Japan .
2162674 2/1986 United Kingdom .

Primary Examiner—Alvin E. Oberley
Attorney, Agent, or Firm—Cushman, Darby & Cushman

[57] ABSTRACT

The system enables the making of half-tones by using the control circuits of the matrix which are not usually designed for this purpose while producing no flicker effect. The system has a memory image with N (greater than or equal or 2) memory planes to store therein light information relating to each pixel in an N-bit word. The planes are read sequentially and thus make N−1 half-tones. In the simplest case (n=2), two planes are used and a first image is produced where any pixel is formed by a first bit, extracted from a first plane, and is preceded and followed, in rows as well as in columns, by a pixel formed by a first bit extraced from the other plane. The addressing is then determined to produce a second image by extracting, in reverse and respectively by each pixel, the second luminance bit in the other memory plane not used for the first image.

17 Claims, 5 Drawing Sheets

FIG_1

FIG_2

FIG_7

| $a_R$ | $b_G$ | $a_B$ | $b_R$ | $a_G$ | $b_B$ | $a_R$ |
|---|---|---|---|---|---|---|
| $a_B$ | $b_R$ | $a_G$ | $b_B$ | $a_R$ | $b_G$ | |
| $a_G$ | $b_B$ | $a_R$ | $b_G$ | $a_B$ | $b_R$ | |
| $a_R$ | $b_G$ | $a_B$ | $b_R$ | $a_G$ | $b_B$ | |
| $a_B$ | $b_R$ | $a_G$ | $b_B$ | $a_R$ | $b_G$ | |
| $a_G$ | $b_B$ | $a_R$ | $b_G$ | $a_B$ | $b_R$ | |
| $a_R$ | | | | | | |

FIG_8

| $b_R$ | $a_G$ | $b_B$ | $a_R$ | $b_G$ | $a_B$ | $b_R$ |
|---|---|---|---|---|---|---|
| $b_B$ | $a_R$ | $b_G$ | $a_B$ | $b_R$ | $a_G$ | |
| $b_G$ | $a_B$ | $b_R$ | $a_G$ | $b_B$ | $a_R$ | |
| $b_R$ | $a_G$ | $b_B$ | $a_R$ | $b_G$ | $a_B$ | |
| $b_B$ | $a_R$ | $b_G$ | $a_B$ | $b_R$ | $a_G$ | |
| $b_G$ | $a_B$ | $b_R$ | $a_G$ | $b_B$ | $a_R$ | |
| $b_R$ | | | | | | |

FIG_9

| a | | | b | | |
|---|---|---|---|---|---|
| | b | | | a | |
| | | a | | | b |
| a | | | b | | |
| | b | | | a | |
| | | a | | | b |

FIG_10

| b | | | a | | |
|---|---|---|---|---|---|
| | a | | | b | |
| | | b | | | a |
| b | | | a | | |
| | a | | | b | |
| | | b | | | a |

FIG_11-A                    FIG_12-A

FIG_11-B                    FIG_12-B

FIG_13

SYSTEM FOR THE DISPLAY OF IMAGES IN HALF TONES ON A MATRIX SCREEN

BACKGROUND OF THE INVENTION

1. Field of the Invention

The invention concerns a system for the display of images in half tones on a monochrome or color matrix screen not designed for this purpose.

The invention applies to plasma screens, electroluminescent screens, fluorescent screens, light-emitting diode screens, liquid crystal screens, etc. In particular, it is well suited to matrix screens and can be used to obtain half tones without any deterioration in the rated electro-optical performance characteristics (appearance, contrast, color, angle of view, flicker etc.) of these screens.

In particular, the method applied makes it possible to obtain an extensive color range on a screen initially designed for eight basic colors.

The term half tones (or so-called "grey scales") refers to any state of luminosity or intermediate contrast between two extremes of the response of an electrooptical effect.

2. Description of the Prior Art

Various methods are used to obtain half tones. In a first method, a spatial distribution or framing is obtained by modulating the surface of the excited zone, for example by sub-dividing the pixel into one or more zones of different areas or, more simply, by lighting up only one pixel out of two. The drawback of this method is that it increases the technological complexity of the screen or reduces the definition of the image.

In another method, the intensity of the electrooptical effect is modified by modulating the amplitude of the voltage applied to the electrooptical material or the period for which this voltage is applied. This method, which is the one commonly used, requires more complicated and more efficient screen control circuits than those used for screens without half tones.

In a third method, a temporal modulation is produced by exciting, for example, every other pixel to obtain, by temporal means, an intermediate luminance level. This causes an increase in flicker.

The aim of the invention is the application of a method of temporal modulation which does not produce any flicker and which, as shall be seen, uses the screen control circuits which are not normally designed for this purpose. The modulation is done at the level of an image memory associated with the screen and no longer at the level of the screen-addressing peripheral circuits.

SUMMARY OF THE INVENTION

According to the invention, there is provided a system for the display of images in half tones on a matrix screen, comprising the following steps:

the preparation of the luminance information relating to a pixel of the image according to an N-bit word (N being greater than or equal to 2);

the storage of luminance information in N memory planes so as to respectively store therein the different bits of each word;

the addressing of the memory planes to produce, through a sequential reading of these planes, N successive displayed images wherein any grouping of N adjacent pixels is obtained by extracting, for each pixel of the grouping, one luminance bit from a memory plane different from those already used for this pixel when forming the preceding images, so as to extract the N bits of the luminance word corresponding to this pixel, and by extracting, from each image, one luminance bit in a different memory plane for each of the pixels of the grouping, so as to extract at each image, one luminance bit in each memory plane;

the method used making it possible to obtain for each pixel, in the course of N successive scans of images, in addition to the two luminance values, black and white, corresponding to two binary states "0" and "1", N-1 intermediate values corresponding to half-tones.

The temporal mean which occurs on two or more images depends on the electro-optical effect used. There is one effect linked to the instantaneous voltage. For example, for light-emitting diodes, the mean is established at the eye because of the duration of retinal persistence (about 40 ms). For periods greater than this, the flicker becomes perceptible. Besides, there is an effect related to the effective voltage: for example, for liquid crystals, this voltage depends on the product of the amplitude by the width of the applied pulse. The mean is got at the level of the electro-optical material on one or more pulses. In particular, it depends on the electrical performance of the electro-optical material and on the associated control element, if any.

Generally, this temporal mean is a combination of the mean values at the level of the electro-optical material and the value pertaining to the observer's eyes.

BRIEF DESCRIPTION OF THE DRAWINGS

The specific features and advantages of the invention will appear in the following description, given by way of example and made with reference to the appended figures, of which.

DESCRIPTION OF PREFERRED EMBODIMENTS

The system has an image generator to produce the video signals in digital form, wherein the luminance information, relating to each pixel of an image considered, is produced as a word of at least two bits.

Figure 1:
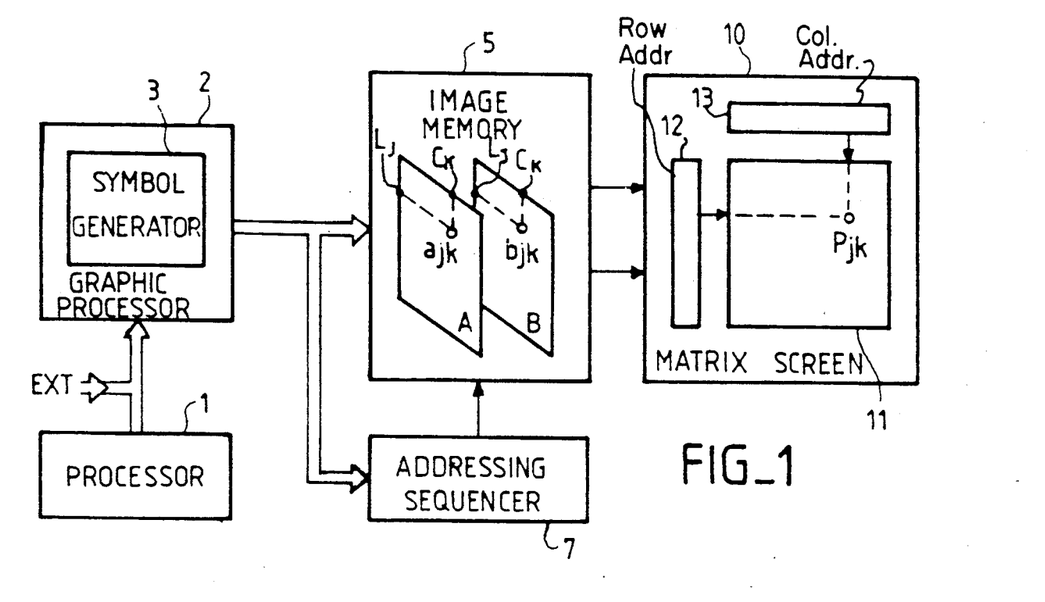
FIG. 1 is a general block diagram of a display system according to the invention.

In the case of an alphanumeric image, or in the case of symbols, the image generator may consist, as shown in FIG. 1, of a graphic processor 2 controlled by a processor 1, said graphic processor 2 comprising a symbol generator 3.

An image memory 5 is interposed between the generator and the matrix display screen 11. This image memory has at least two planes.

In the following description, we shall consider the most simply designed and most easily understandable example where the luminance is codified in a two-bit word and where the memory 5 has two planes.

The binary luminance of a pixel of the row $L_j$ and the column $C_k$ consists of the first bit $a_{jk}$ stored in electrical form in a first memory plane A and a second bit $b_{jk}$ stored in the second memory plane B. A sequencer circuit 7 produces the addressing of the memory 5 when reading and writing.

The display device 10 has a matrix screen 11 and row and column addressing circuits 12 and 13 respectively. The pixel $P_{jk}$ has a mean luminance corresponding to $(a+b)/2$ at the end of two successive scans.

This system can thus be used, when a and b are equal, to produce a mean state equal to "1" or a mean state equal to "0", namely the white or black tone in the display of the corresponding pixel P. The system further makes it possible to produce a third state which is the half tone "½" corresponding to the case where the values a and b are distinct, one being equal to "1" while the other is equal to "0". The luminance of the point P can therefore assume one of three values "1", "0" or "½" considered during two successive image scans performed at a defined rate, to allow for retinal persistence and to avoid flicker.

Figure 3:
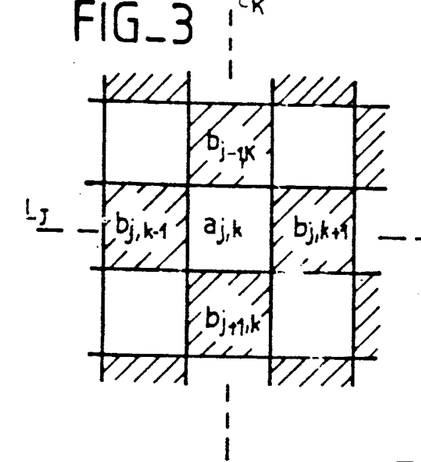
FIGS. 3 and 4 show a zone of the matrix during two successive image scans to highlight the method for alternately extracting, from the memory plane, the luminance information relating to the successive pixels of a monochrome image.
Figure 4:
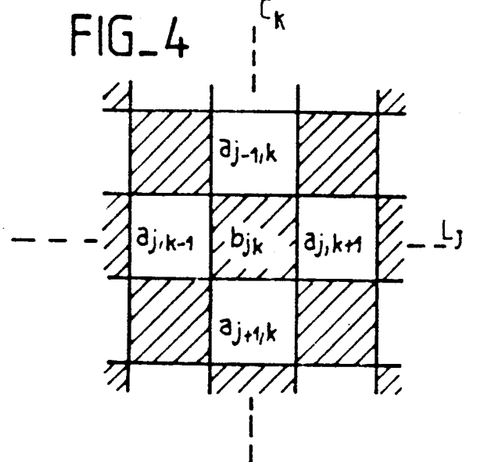

The method used to extract luminance data from the memory plane further produces an interlacing of a pixel with the following one as shall be seen more explicitly in FIGS. 3 and 4 where a small zone of the matrix around the order jk pixel is considered. According to this method, the adjacent pixels are formed alternately by luminance information extracted from the memory plane A for a given pixel and in the memory plane B for the following pixel, with the alternation being valid as much in rows as in columns. Thus, for each image i, N adjacent pixels have information stored in a memory plane in the form P1(i), P2(i), ... Pk(i), ... Pn(i). Accordingly, a circular permutation may be used to alternately form adjacent pixels with respect to successive images:

$$P1(i+1)=PN(i), P2(i+1)=P1(i), \ldots$$

$$Pk(i+1)=Pk-1(i), \ldots PN(i+1)=PN+1(i).$$

In the figures, hatched lines are used to distinguish the pixels corresponding to the luminance information b extracted from the plane B, the non-hatched pixels being those extracted from the plane A. The result of this checkerboard interlacing of the pixels is that the half tone created by the effect of the mean $(a+b)/2=$"½" produces no flicker. This flicker would otherwise exist and would be visible in the half tone ranges if, during an order N addressing stage, firstly, all the luminance information a were extracted from the plane A and, during the following order N+1 addressing stage, all the luminance information b were extracted from the plane B.

Once the alternate checkerboard type reading is done, this flicker disappears. The image can thus comprise ranges of the same tones. The term 'range' refers to at least two neighboring pixels with an identical mean luminance state.

The addressing sequences are performed by the circuit 7 in addressing, for the even-order addressing stages, pixels of the same row and column parity such as ajk through the plane A, and pixels of opposite row and column parity such as bj,k+1 or bj,k-1 or bj+1,k or bj-1,k through the plane B. For the odd-order addressing stages, the addressing is done for pixels of the same parity by the plane B and for pixels of opposite parity by the plane A, namely, in reverse to what is shown in FIG. 4.

It must be noted that the greater the number of pixels taken into account to make a monochrome range, the better will be the visual appearance.

For a polychrome display unit, the spatial distribution of the color pixel is proper to each embodiment of a display unit. Two types of distributions are, for example, row distribution and diagonal distribution of the trios RGB (these letters respectively indicating the red, green and blue shades).

Figure 5:
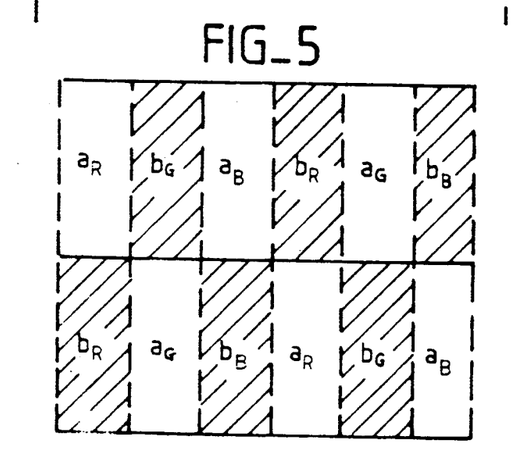
FIGS. 5 and 6 are diagrams equivalent to those of FIGS. 3 and 4, but relate to the case of a color image with a row arrangement of the pixels.
Figure 6:
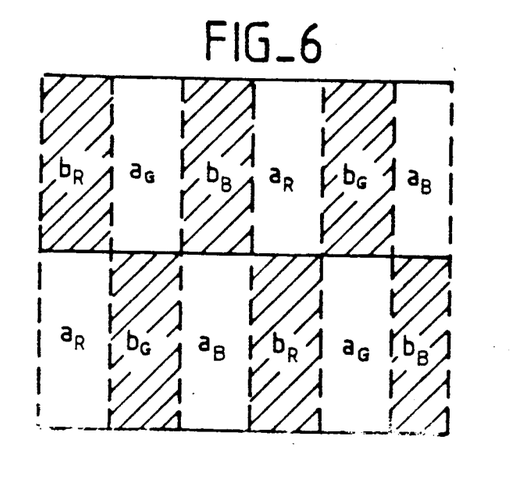

For display unit with distribution in rows, FIGS. 5 and 6 represent two successive addressing stages for a demarcated zone of the matrix corresponding to four trios, two in rows and two in columns. It is seen that the row and column addressing procedure corresponds to that of a monochrome display unit according to FIGS. 3 and 4.

Figure 7:
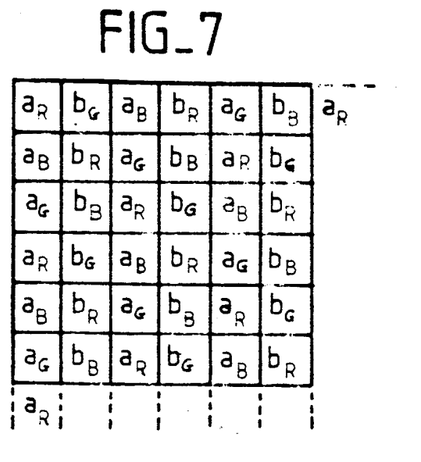
FIGS. 7 and 8 are diagrams equivalent to those of FIGS. 3 and 4 in the case of a color image with a diagonal arrangement of the pixels.
Figure 8:
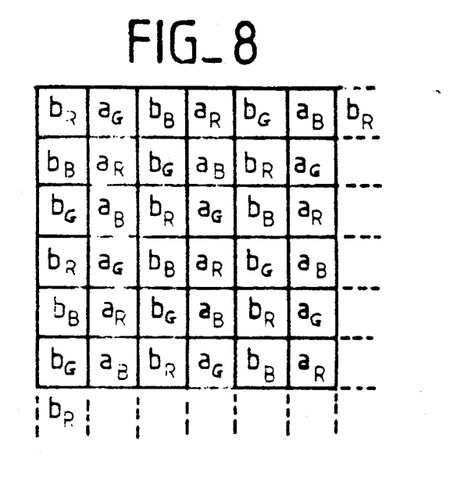

For a diagonal distribution display unit, FIGS. 7 and 8 represent two successive addressing stages which distribute the colored pixels a and b coming from the planes A and B. The addressing method is different from that of the monochrome display unit or that of the polychrome display unit with distribution in rows as described above. Owing to the diagonal distribution, in applying the previous addressing method, diagonal elements of a same color would be obtained, extracted from one and the same memory plane in the formation of an image. To obtain greater isotropy, a different procedure is preferably used for the addressing, in alternating from one column to the other. There are two image scan stages, one even-order stage and one odd-order stage. The even-order stage is for addressing the pixels of the even-order columns by a first memory plane and for addressing the pixels of the odd-order columns by the second memory plane. In the odd-order addressing stage, the pixels of the even-order columns are addressed by the second memory plane, and the pixels of the odd-order columns are addressed by the first memory plane.

Figure 9:
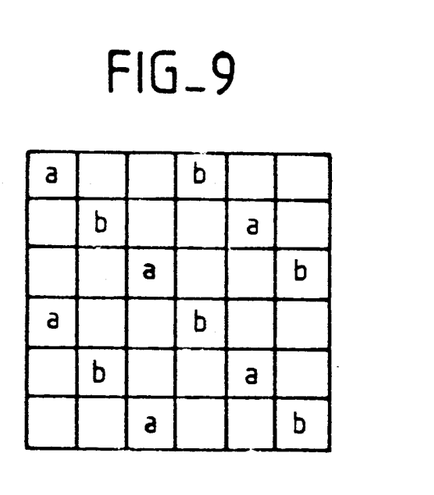
FIGS. 9 and 10 give a partial view of FIGS. 7 and 8 relating to the color red.
Figure 10:
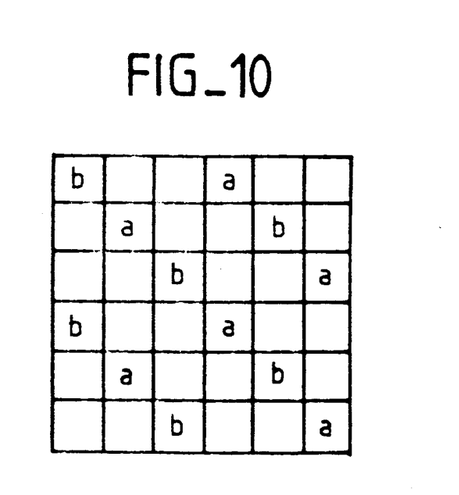

FIGS. 9 and 10 correspond to parts extracted from FIGS. 7 and 8 for pixels of one and the same color. In the example shown the color is red. With the addressing procedure considered, it is realized that the successive elements of the diagonal are extracted from different memory planes. Although the elements extracted from any column for each image belong to one and the same plane, the successive elements relate to different tones. It will be noted that, just as for the monochrome display, the greater the number of pixels forming a range of the same tone, the better will be the corresponding visual appearance.

Figure 2:
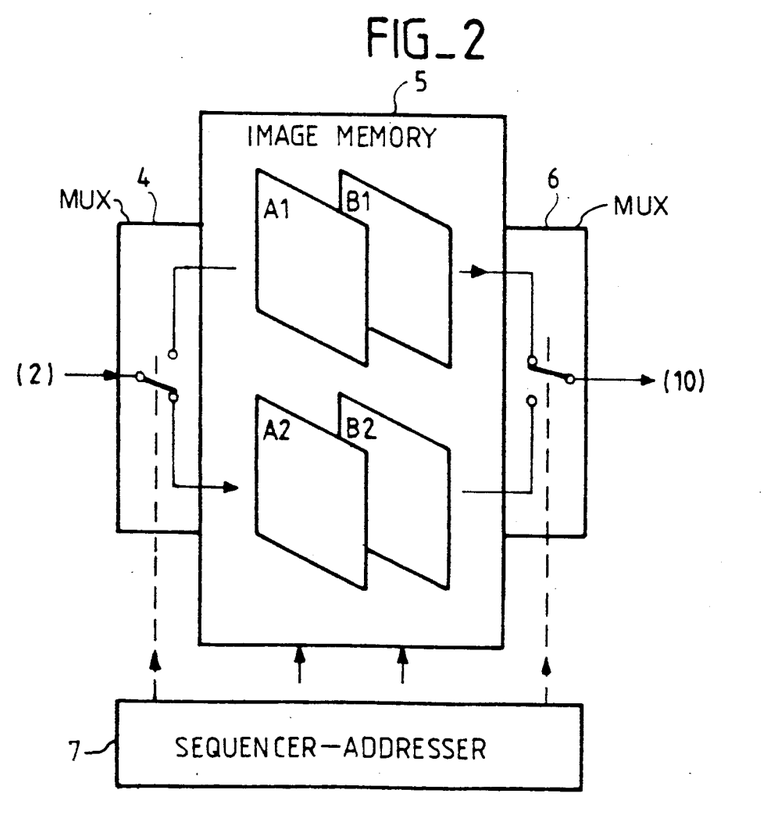
FIG. 2 is a partial drawing relating to the design of the image memory.

For the application of the method, the image memory is designed according to the drawing of FIG. 2 comprising, in fact, two pairs of planes A1, B1 and A2, B2, used alternately for reading and writing. Thus, the reading of an image is done, for example, by extracting data from the set A1, B1, the writing of the following image is done by filling the planes A2, B2. To provide these functions, switch-over devices called multiplexers 4 and 6 are interposed at the input and the output.

In the case of a liquid crystal display unit, if 1/FO designates the time of an addressing stage used to address all the pixels successively, the excitation signal to be applied to each pixel is symmetrical and its frequency is FO/2. FIG. 11A represents the null voltage $V_E$ applied to a non-excited pixel and FIG. 11B represents a corresponding luminance taken during a first interval 1/FO around a mean value b+ and during a second interval 1/FO around a mean value b−. FIGS. 12A and 12B respectively relate to an excited pixel, the voltage applied being a peak which varies from +V to −V during two successive intervals 1/FO: the luminance state respectively presents the mean value a+ and a−. The spectral breakdown of the excitation signal $V_E$ is free of null frequency lines and thus the application of a mean excitation component to the liquid crystal is avoided.

Figure 11:
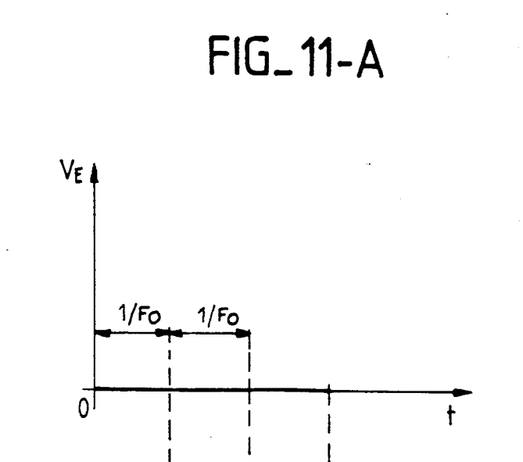
FIGS. 11A and 11B, 12A and 12B show, in the example of a liquid crystal display unit, the excitation signal and the luminosity of a pixel for the non-excited and excited states respectively.
Figure 12:
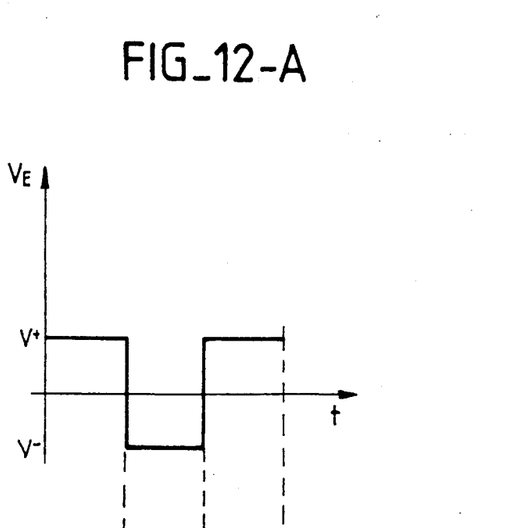
Figure 13:
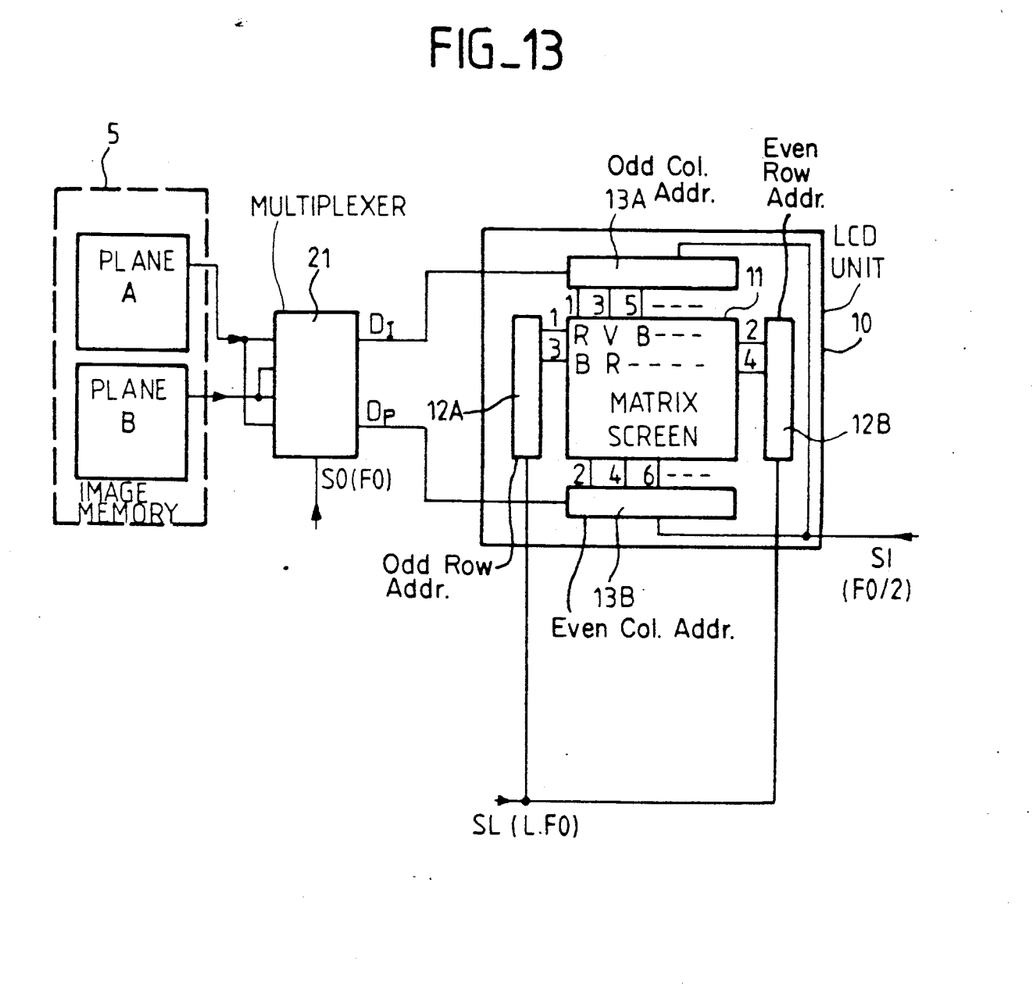
FIG. 13 is a diagram showing a mode of designing the set comprising the display unit, the image memory and the sequencer.

FIGS. 11 and 12 represent an entire period of the theoretical excitation signal to be applied to a lit pixel (FIGS. 12A and 12B) and to an off pixel (FIGS. 11A and 11B). The imperfection of the circuits addressing each cell leads to slight luminance ripple especially at high incidence of observation between two successive addressing stages: the electrical time constants and the viscosity and elastic time constants proper to the liquid crystal eliminate the high frequency components.

The frequency of the luminance signal or image frequency is therefore FI=FO/2. Its minimum value chosen so as not to cause any flicker must range from 45 to 60 Hz. It follows from this that. FO ranges from 90 to 120 Hz at least for a liquid crystal display unit.

The two different binary states of luminance a and b , for their part, cause a far greater luminance ripple. Assuming that a is the luminance level of a lit pixel and b is the luminance level of an off pixel, the making of the semi-luminance (a+b)/2 calls for two entire images, namely, four successive scanning stages instead of the two stages envisaged earlier in the cases of FIGS. 3 to 10. The four luminance levels a+, a−, b+, b− are averaged during the periods 4/FO. The sequence used to optimize vision consists in minimizing the changes in luminance and in making the greater luminance changes at the highest frequency. This optimal sequence is, therefore, a+, b+, a−, b− in the example shown in FIGS. 11B and 12B.

For a standard display unit with a binary luminance level (without half tones), the luminance of any pixel is encoded by one bit. The color achieved by the spatial composition of a trichromatic display unit is encoded either by a three-bit word, wherein each bit represents the binary state of each pixel, colored red, green or blue, either a corresponding decimal number or its name. The $2^3$ i.e. eight colors which can be achieved by spatial composition are recalled in the following table No. 1.

TABLE 1

| COLOR NO. | CODE (RGB) | NAME |
| --- | --- | --- |
| 0 | 000 | black |
| 1 | 001 | blue |
| 2 | 010 | green |
| 3 | 011 | cyan |
| 4 | 100 | red |
| 5 | 101 | violet |
| 6 | 110 | yellow |

TABLE 1-continued

| COLOR NO. | CODE (RGB) | NAME |
| --- | --- | --- |
| 7 | 111 | white |

The temporal mean on two successive states of binary luminance of any pixel may assume, according to the invention, three different values which can now be encoded by a base 3 digit, this digit being the half sum of two successive luminance states during an N order display and the following N+1 order display.

The color achieved by spatial composition of a trichromatic display unit may therefore be encoded either by a three-digit word, each representing the ternary states of each of the red, green and blue pixels either by a corresponding decimal number or by its name. Only $3^3$, namely 27 different colors, can be achieved by spatial composition.

Different temporal compositions of colors may give the same resultant color, but, among these compositions, only one is optimal.

One and only one pair of colors, temporally composed in an optimal way, can be made to correspond to a given resultant color.

The temporal composition of the eight colors composed spatially by means of the three primary colors, red, green and blue, can be made in 8×8, namely 64 different ways.

Since the temporal (mean) composition is commutative, the number of non-equivalent temporal compositions is equal to the number of 2×2 combinations of the eight different colors increased by the number of combinations of each of the eight colors with itself, giving 36 in the present case.

Among these 36 temporal compositions, 9 should preferably be excluded because of a lack of efficiency as regards ocular response. These 27 compositions of different colors are listed in table 2 below which be considered as being neither unique nor restrictive.

TABLE 2

| COLOR NO. | CODE (RGB) | NAME |
| --- | --- | --- |
| 0 | 000 | Black |
| 1 | 001 | Blue (dark) |
| 2 | 002 | Blue (light) |
| 3 | 010 | Green (dark) |
| 4 | 011 | Cyan (light) |
| 5 | 012 | Cyan blue |
| 6 | 020 | Green (light) |
| 7 | 021 | Cyan green |
| 8 | 022 | Cyan (light) |
| 9 | 100 | Red (dark) |
| 10 | 101 | Violet (dark) |
| 11 | 102 | Purple |
| 12 | 110 | Yellow (dark) |
| 13 | 111 | Grey |
| 14 | 112 | Pale blue |
| 15 | 120 | Yellow green |
| 16 | 121 | Pale green |
| 17 | 122 | Pale cyan |
| 18 | 200 | Red (light) |
| 19 | 201 | Violet red |
| 20 | 202 | Violet (light) |
| 21 | 210 | Orange |
| 22 | 211 | Pink |
| 23 | 212 | Pale violet |
| 24 | 220 | Yellow (light) |
| 25 | 221 | Pale yellow |
| 26 | 222 | Whitep |

The embodiment of FIG. 3 corresponds to a liquid crystal display unit 10 in which the color pixels are distributed diagonally. It has an even number C of columns and an even number L of rows. These addressing internal peripheral circuits consist of a circuit 13A to address the odd-order columns and a circuit 13B to address the even-order columns. For row addressing, they consist of an addressing circuit 12A for addressing odd-ordered rows and and a circuit 12B for addressing even-ordered rows.

The binary video signal coming from the memory planes A and B is serialized through a multiplexer circuit 21 on two channels DI and DP respectively designed for the column addressing circuit, 13A for the odd-order rows and 13B for the even-order rows.

Various synchronizing signals are given to the row and column addressing circuits 12 and 13: the synchronous signals indicated have the frequency FO signals SO, the frequency FO/2 frequency signals SI and the frequency L.FO frequency signals SL, where L is the number of rows.

The content of the memory planes A and B is given in parallel to the circuit 21 which is a double multiplexer controlled by the signal FO. This circuit 21 does a permutation of the signals from one column to the other by shunting them to the respective input channels DI, DP of the display unit 10.

The signal S1 provides the changes in state of the output of the peripheral circuits in such a way that the driving signal of an elementary cell has a bipolar shape 10 shown in FIG. 12A.

The signal SL is used for row addressing in the circuits 12A and 12B.

The display system described can be extended to obtain any number N of intermediate tones by using a number N of memory planes greater than 2. In a concept of this type, it is necessary to produce N successive images displayed, wherein any grouping forming a range of N adjacent pixels results from the extraction, for each pixel of this grouping, of a luminance bit from a memory plane which is different each time from those used for the other pixels of the grouping and also different from the memory planes which had been used for this pixel in the formation of the preceding images so as to extract the N luminance bits corresponding to each pixel. When passing from one image to the following one, the extraction is determined by doing a circular permutation of the order of extraction from the memories used to address the preceding image. Thus, for example, if five memory planes ABCDE are considered, it can be assumed, during the formation of the first image, that the extraction for the first pixel is done at A, for the second pixel at B and so on, in the plane E for the fifth pixel. During the second image, the order of the extraction will be BCDEA and so on until the fifth extraction which will be EABCD.

In practice, the number N cannot be high because of physical limits, especially related to the maximum frequency of the column addressing circuits and because the duration of the N successive scans should be defined so as to preserve retinal persistance and prevent the flicker phenomenon.

What is claimed is:

1. A system for the display of images in half tones on a matrix screen, comprising the following steps:
   preparing luminance information for each pixel of one of the images according to a corresponding N-bit word, N being greater than or equal to 2;
   storing the luminance information in N memory planes with respect to the N-bit word;
   addressing the memory planes to produce, through a sequential reading of these planes, N successive displayed images wherein any grouping of N adjacent pixels is obtained by successively extracting, for a given pixel of said grouping, one luminance bit from one of the memory planes different from those already used for said given pixel when forming the preceding images so as to extract the N bits of the luminance word corresponding to said given pixel, said addressing step extracting, in a given image of said N successive displayed images, for each of the pixels of any considered one of said groupings, one luminance bit in a different memory plane from those used for the other pixels of said considered grouping, thereby obtaining for each pixel, in the course of N successive scans of images, N-1 intermediate values in addition to the luminance values black and white corresponding to binary values "0" and "1" respectively, said N-1 intermediate values corresponding to half-tones.

2. A system according to claim 1, wherein the extraction in the memory planes from one image to the next one is defined by making a circular permutation of an order of extraction from these memories which were used during the addressing of a previous image.

3. A system according to claim 1, wherein the luminance information relating to said each pixel is encoded in a two-bit word and is stored in two memory planes, the addressing of the planes being produced by alternate reading of these planes, with a first displayed image where said each pixel is controlled by said corresponding luminance bit extracted from one of the two memory planes, said each pixel being preceded and followed by an adjacent pixel controlled by the corresponding luminance bit extracted from the other memory plane, said addressing then producing a second displayed image by extracting for said each pixel considered the corresponding second luminance bit from the other memory plane not used for the first image, said second luminance bit being an opposite value of said first luminance bit.

4. A system according to claim 3, wherein said addressing step has an image frequency corresponding to the scan period of one of said first and second images being at least equal to 45 Hz.

5. A system according to claim 3, wherein the luminance information of said one of said images is written in two memory planes, to respectively store therein the first and second bit of each word, and simultaneously the reading of the luminance information stored in two other memory planes is done in which are stored, respectively, the first and second bit of each word of a preceding image.

6. A system according to claim 3, wherein the matrix screen includes an arrangement of color pixels in rows, the sequence for addressing the rows and columns of the matrix screen comprising: an even parity image scan stage for addressing the pixels of a same row and column parity by using a first of said two memory planes, said even parity image scan stage addressing pixels of rows and columns of different parity by a second of the two memory planes; and an odd parity addressing stage for addressing the pixels of the same parity by the second memory plane and the pixels of opposite parity by the first memory plane.

7. A system according to claim 3, wherein the matrix screen includes a diagonal arrangement of color pixels, the sequence for addressing the rows and columns of the display unit comprising: an even parity stage for addressing the pixels of even-order columns by a first of said two memory planes, said even parity stage addressing the pixels of odd-order columns by a second of said two memory planes; and an odd parity addressing stage for addressing the pixels of even-order columns by the second memory plane and the pixels of odd-order columns by the first memory plane.

8. A system according to claim 2, wherein the luminance information relating to said each pixel is encoded in a two-bit word and is stored in two memory planes, the addressing of the planes being produced by alternate reading with a first displayed image where said each pixel is controlled by said corresponding luminance bit being extracted from one of the two memory planes, said each pixel being preceded and followed by an adjacent pixel controlled by the corresponding luminance bit extracted from the other memory plane, said addressing then producing a second displayed image by extracting for each pixel considered the corresponding second luminance bit from the other memory plane not used for the first image, said second luminance bit being an opposite value of said first luminance bit.

9. A system according to claim 8, wherein said addressing step has an image frequency corresponding to the scan period for one of said first and second images being at least equal to 45 Hz.

10. A system according to claim 8, wherein the luminance information of said one of sid images is written in two memory planes, to respectively store therein the first and second bit of each word, and simultaneously the reading of the luminance information stored in two other memory planes is done in which are stored, respectively, the first and second bit of each word of a preceding image.

11. A system according to claim 8, wherein the matrix screen includes an arrangement of color pixels in rows, the sequence for addressing the rows and columns of the display unit comprising: an even parity image scan stage for addressing the pixels of a same row and column parity by using a first of said two memory planes, said even parity image scan stage addressing pixels of rows and columns of different parity by a second of the two memory planes; and an odd parity addressing stage for addressing the pixels of the same parity by the second memory plane and the pixels of opposite parity by the first memory plane.

12. A system according to claim 8, wherein the matrix screen includes a diagonal arrangement of color pixels, the sequence for addressing the rows and columns of the display unit comprising: an even parity stage for addressing the pixels of even-order columns by of said two first memory planes, said even parity stage addressing the pixels of odd-order columns by a second of said two memory planes; and an odd parity addressing stage for addressing the pixels of even-order columns by the second memory plane and the pixels of odd-order columns by the first memory plane.

13. A system according to claim 1 wherein the display unit is a liquid crystal display unit.

14. A system according to claim 6 wherein the display unit is a liquid crystal display unit and wherein, for a color display, the number of distinct color compositions is equal to 36.

15. A system according to claim 6 wherein the number of color compositions is limited to 27 for optimum rendition with respect to visual perception, said color compositions being listed in three possible modes of designation, by a color number 0 to 26, or by the number of the tone, or by a code consisting of a three-digit word, respectively representing the binary states R, G, B.

| COLOR NO. | CODE (RGB) | NAME |
|---|---|---|
| 0 | 000 | Black |
| 1 | 001 | Blue (dark) |
| 2 | 002 | Blue (light) |
| 3 | 010 | Green (dark) |
| 4 | 011 | Cyan (light) |
| 5 | 012 | Cyan blue |
| 6 | 020 | Green (light) |
| 7 | 021 | Cyan green |
| 8 | 022 | Cyan (light) |
| 9 | 100 | Red (dark) |
| 10 | 101 | Violet (dark) |
| 11 | 102 | Purple |
| 12 | 110 | Yellow (dark) |
| 13 | 111 | Grey |
| 14 | 112 | Pale blue |
| 15 | 120 | Yellow green |
| 16 | 121 | Pale green |
| 17 | 122 | Pale cyan |
| 18 | 200 | Red (light) |
| 19 | 201 | Violet red |
| 20 | 202 | Violet (light) |
| 21 | 210 | Orange |
| 22 | 211 | Pink |
| 23 | 212 | Pale violet |
| 24 | 220 | Yellow (light) |
| 25 | 221 | Pale yellow |
| 26 | 222 | White |

16. A system according to claim 3, wherein said addressing step has an image frequency corresponding to the scan period of one of said first and second images being at least equal to 90Hz for a liquid crystal matrix screen.

17. A system according to claim 8, wherein said addressing step has an image frequency corresponding to the scan period of one of said first and second images being at least equal to 90Hz for a liquid crystal matrix screen.

* * * * *